J. C. GEHRING, Jr. & R. D. CONRAD.
WELDING TORCH.
APPLICATION FILED AUG. 11, 1913.
1,078,578.
Patented Nov. 11, 1913.
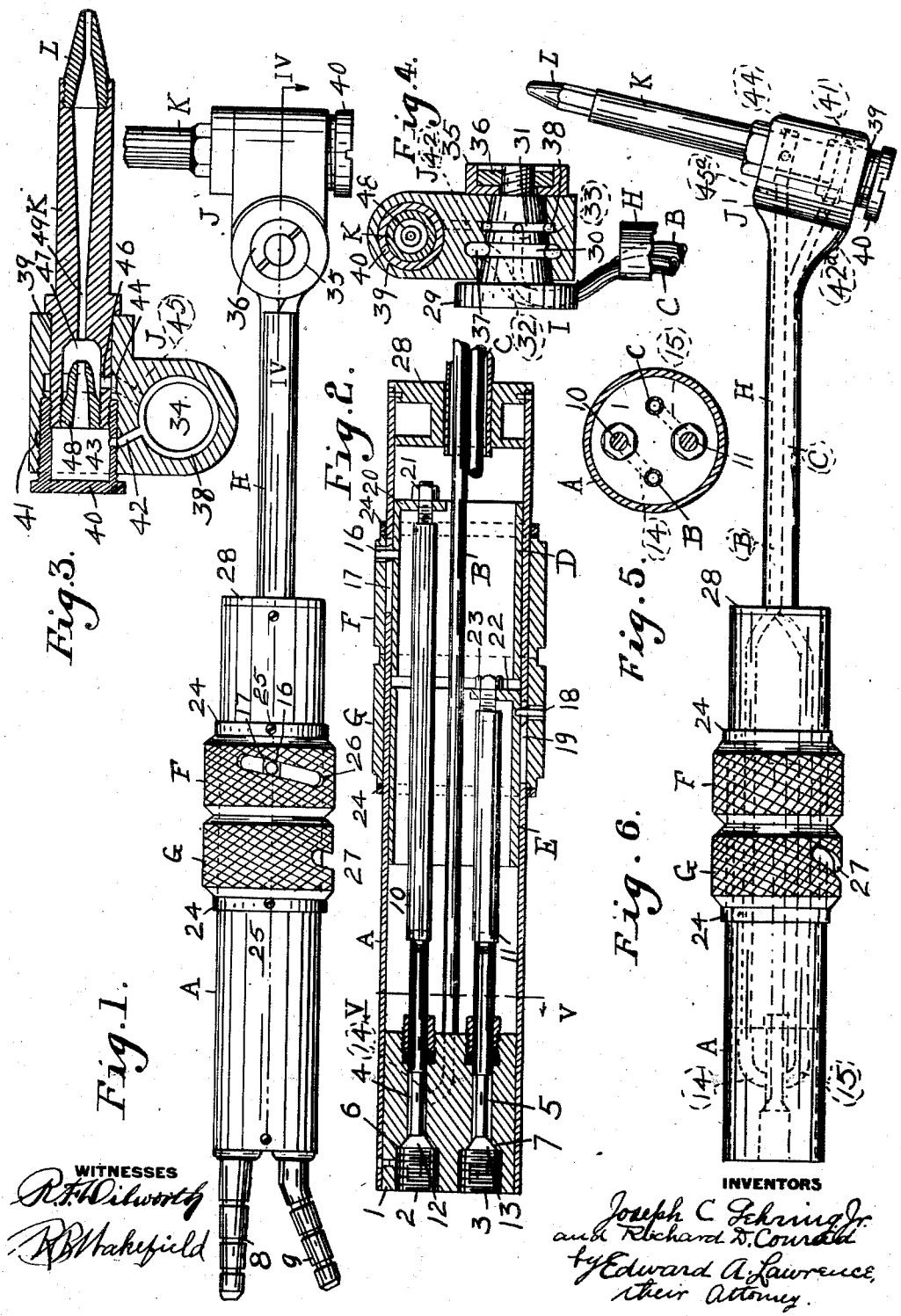
WITNESSES
R. F. Dilworth
R. B. Wakefield
INVENTORS
Joseph C. Gehring Jr.
and Richard D. Conrad
by Edward A. Lawrence,
their Attorney.

UNITED STATES PATENT OFFICE.

JOSEPH C. GEHRING, JR., AND RICHARD D. CONRAD, OF PITTSBURGH, PENNSYLVANIA.

WELDING-TORCH.

1,078,578.   Specification of Letters Patent.   Patented Nov. 11, 1913.

Application filed August 11, 1913. Serial No. 784,059.

*To all whom it may concern:*

Be it known that we, JOSEPH C. GEHRING, Jr., and RICHARD D. CONRAD, citizens of the United States, and residing in the city of Pittsburgh, in the county of Allegheny and State of Pennsylvania, have invented or discovered new and useful Improvements in Welding-Torches, of which the following is a specification.

Our invention comprises new and useful improvements in welding torches in which oxygen and acetylene or other gases are used.

More particularly it consists in new and improved means for regulating the supply and proportions of the gases, whereby its operator may control the latter with the hand which holds the torch.

Our invention consists also in a new and improved head whereby the tip may be adjusted at an angle most convenient for the work in hand.

Other novel features of structure and arrangement of parts will appear from the following description.

In the accompanying drawings, Figure 1 is a side elevation of our improved torch, the tip being shown broken away at the end; Fig. 2 is an enlarged longitudinal section of the same; Fig. 3 is a sectional view of the head and tip, the tip being shown for the entire length; Fig. 4 is a section along the line IV—IV in Fig. 1, the pivot stud being shown in full; Fig. 5, is a cross section along the line V—V in Fig. 2 and Fig. 6 is a side elevation of a torch having a fixed head.

For the sake of illustration the gas tubes B and C and the threaded holes 2 and 3 are shown turned 90° from their positions in Fig. 2.

The following is a detailed description of the drawings, reference being first had to Figs. 1, 2, 3, 4, and 5: A is a cylindrical casing one end of which is closed by a plug 1 having formed in its outer end two threaded holes 2 and 3 whose inner ends connect respectively into bores 4 and 5 extending to the inner end of said plug. The diameter of said bores is less than that of the threaded holes 2 and 3 and at the junctures of said holes and bores are formed tapered valve seats 6 and 7. Into the holes 2 and 3 are screwed the tapered couplings 8 and 9 for the attachment of the usual flexible tubes for the supply of acetylene and oxygen respectively. 10 and 11 are a pair of valve stems movable longitudinally within casing A and having their ends extending respectively through the bores 4 and 5. The end of stem 10 is provided with a tapered valve head 12 to coact with the valve seat 6 while the end of stem 11 is provided with a similar valve head 13 to coact with seat 7. From the bore 4 a lateral passage 14 leads through the plug 1 to an acetylene tube B which extends through the casing A while a similar lateral passage 15 (Fig. 6) leads from the bore 5 to the oxygen tube C. It is thus evident that by moving the proper valve stem longitudinally the supply of oxygen to tube C or of acetylene to tube B may be cut off or nicely adjusted and controlled. D and E are a pair of guide members mounted in tandem in the interior of casing A. The member D is provided with a stud 16 which engages a longitudinal slot 17 in the casing A while the member E is provided with a similar stud 18 which engages a similar slot 19 in casing A. Said guide members are spaced apart so as not to interfere with each others movement. It is evident that said guide members are capable of longitudinal movement only, in said casing. The member D is provided with an inwardly extending pierced lug 20 through which the reduced threaded end of stem 10 extends, a nut 21 being provided to screw up against said lug to regulate the effective length of stem 10. The member E is provided with a similar lug 22 through which the reduced threaded end of the stem 11 extends to be engaged by a nut 23. F and G are a pair of rotary hand grasp collars mounted on the casing A and prevented from longitudinal movement by rings 24 which are held rigidly in place on casing A as by set screws 25. The grasp F is provided with an oblique slot 26 which is engaged by the stud 16 of member D and the grasp G is provided with a similar oblique slot 27 which is engaged by the stud 18 of the member E. It is thus evident that by rotating the grasp F the member D may be moved longitudinally thus regulating the admission of the gas to the tube B while the rotation of the grasp G moves member E longitudinally and regulates the admission of the gas to tube C. The tubes B and C are brought together at the other end of casing A and enter the smaller casing H whose butt is fixed in the plug 28 in the end of casing A. Said tubes B and C extend through the casing H and are preferably brazed thereto at both ends to obtain the proper stiffness. The outer ends of the tubes are joined integrally with the tapered pivot stud I provided with an extended base 29. Said stud I is provided with two spaced apart circumferential grooves or channels 30 and 31, the former being nearer the base 29 and the larger of the two. The tube B communicates with the groove 30 by means of a passage 32 in the body of the pivot stud and a smaller passage 33 connects the tube C with the groove 31. The head J is provided with a tapered bore 34 which engages the pivot stud I and is held thereon by means of countersunk washer 35 and a nut 36 seated in said washer and engaging the reduced threaded end of said pivot stud. The bore 34 is provided with a large cicumferential groove or depression 37 which registers with the groove 30 of the pivot stud and a smaller circumferential groove or depression 38 which registers with the groove 31 of the pivot stud. The head J is provided with a second bore 39 at right angles to bore 34. The butt end of said bore 39 is internally threaded to receive the threaded perimeter of a bushing 40. The threaded portion of bore 39 is provided with a cicumferential groove 41 which communicates by a passage 42 with the groove 38 of the bore 34 and the bushing 40 is provided with a port 43 which admits the gas from the groove 41 into the interior of the bushing. The forward portion of bore 39 is of reduced diameter and is a sliding fit for the butt end of the tip K which screws into the open end of bushing 40, the interior of the bushing 40 being threaded for that purpose. The bore 39 is provided with a circumferential groove 44 which surrounds the tip K and communicates by means of a passage 45 with the circumferential groove 37 of bore 34 and the tip K is provided with a lateral port 46 which leads from said groove 44 into the enlarged bore 47 of said tip. 48 is a reducing injector-nipple or jet screwed into the threaded interior of the butt of said tip K and extending past the port 46. The bore of said tip K is reduced as at 49 in front of nipple 48 and then gradually expands to the end of said tip into which is screwed the removable nozzle L. It is evident that the acetylene or other gas will enter through the tube B, passage 32 groove 30 passage 45, groove 44 and port 46 into the enlarged bore 47 of the tip K. The oxygen or other gas will enter through the tube C, passage 33, groove 31, passage 42 groove 41 and port 43, into the interior of the bushing 40 thence passing through the injector nipple 48 into the bore of the tip. The oxygen being at greater pressure than the acetylene injects the same from the tube B. It is evident that by loosening the nut 36, the head J may be swung at any convenient angle to the stock of the torch and held in its adjusted position by tightening said nut.

In the case of Fig. 6 we have shown a fixed or stationary head, the outer end of casing H being integral with the head J'. The acetylene tube B communicates by a passage 45ª with the groove 44 in the bore 39 of the head while the oxygen tube C communicates by a passage 42ª with the groove 41 of the bore 39. The mounting of the tip K in the bore 39 is the same as that described in connection with Fig. 3.

The advantage of threading the tip K into the bushing 40 instead of directly into the head is that the frequent change of tips to suit various thicknesses of metal and different uses is liable to wear out the receiving thread. Thus when the internal thread of a bushing is destroyed, a new bushing may be substituted in a moment and the torch made as good as new. Otherwise an entire new head or in the case of a solid headed torch, an entire new torch would be required.

By means of the hand grasp the quantity of gas may be regulated with the hand holding the torch, thus greatly simplifying and facilitating the use of the torch. The valves open against pressure in the couplings 8 and 9 so that excess pressure in the flexible connecting tubes will not tend to open the valves but will really have the opposite effect which will be counteracted by the friction of the controlling mechanism and the pressure of the hand against the grasps.

What we desire to claim is:—

1. In a torch, a head, a tube communicating with said head for the supply of gas thereto, a casing surrounding said tube and forming the handle of said torch, a movable grasp-collar mounted on said casing, a valve controlling the supply of gas to said tube, and connecting means between said valve and said collar whereby the adjustment of said valve is effected by the movement of said collar on said casing.

2. In a torch, a head, a tube communicating with said head for the supply of gas thereto, a casing surrounding said tube and forming the handle of said torch, a movable grasp-collar mounted on said casing, a valve controlling the supply of gas to said tube and opening against pressure, and connecting means between said valve and said collar whereby the adjustment of said valve is effected by the movement of said collar on said casing.

3. In a torch, a head, a tube communicating with said head for the supply of gas thereto, a casing surrounding said tube and forming the handle of said torch, a valve controlling the supply of gas to said tube, a member mounted in said casing and sliding longitudinally therein and operatively connected with said valve to control the same, a rotary grasp-collar mounted on said casing, and means whereby when said collar is rotated longitudinal movement is imparted to said member.

4. In a torch, a head, a tube communicating with said head for the supply of gas thereto, a casing surrounding said tube and forming the handle of said torch, a plunger valve opening against pressure and controlling the supply of gas to said tube, a member mounted in said casing and sliding longitudinally therein, and operatively connected with said valve, a rotary grasp-collar mounted on said casing, and means whereby the rotation of said collar imparts longitudinal motion to said member.

5. In a torch, a head, a tube communicating with said head for the supply of gas thereto, a casing surrounding said tube and forming the handle of said torch, said casing being provided with a longitudinal slot, a rotary grasp-collar mounted on said casing and provided with an oblique slot intersecting said first slot, a valve controlling the supply of gas to said tube, a member slidingly mounted in said casing and operatively connected with said valve to control the latter, and a stud projecting from said member and engaging both of said slots.

6. In a torch, a head, a tube communicating with said head for the supply of gas thereto, a casing surrounding said tube and forming the handle of said torch, said casing being provided with a longitudinal slot, a rotary grasp-collar mounted on said casing and provided with an oblique slot intersecting said first slot, a plunger valve controlling the supply of gas to said tube, a member slidingly mounted in said casing and secured to the stem of said valve, and a stud projecting from said member and engaging both of said slots.

7. In a torch, a head having an open bore, a bushing having a closed outer end screwed into one end of said bore, a tip extending into the other end of said bore and screwed into said bushing, means for supplying a gas to the interior of said tip, and means for supplying a second gas to the interior of said bushing.

8. In a torch, a head having an open bore and passages for the admission of oxygen and acetylene or other gases to said bore, a bushing having a closed outer end screwed into one end of said bore and provided with a lateral port for the admission of one of said gases to the interior of said bushing, and a tip extending into the other end of said bore and screwed into the open end of said bushing, said tip being provided with a lateral port for the admission of the other of said gases to said tip.

9. In a torch, a head having an open bore and passages for the admission of gases to said bore, a bushing having a closed outer end screwed into one end of said bore and provided with a lateral port for the admission of one of said gases to the interior of said bushing, a tip extending into the other end of said bore and screwed into the open end of said bushing, said tip being provided with a lateral port for the admission of the other of said gases to said tip, and means for feeding and restricting the gas from the bushing to the tip past the lateral port in the tip whereby the last named gas is injected into the tip.

10. In a torch, gas conducting tubes, a pivot stud rigidly attached to said tubes and having passages connecting with the same, a head having a bore in which said stud is adapted to be mounted, said head being provided with a second bore at an angle to said first bore and said head being provided with passages connecting said bores, and a tip mounted in said second bore and adapted to receive the gases from the passages in the head.

11. In a torch, gas conducting tubes, a pivot stud rigidly attached to said tubes, said stud being provided with circumferential grooves and passages connecting each tube with one of said grooves, a head having a bore in which said stud is adapted to be mounted, said head being provided with a second bore at an angle to said first bore and said head being also provided with passages leading from the grooves in said pivot stud to the interior of said second bore, and a tip mounted in said second bore and receiving gases from said last named passages.

Signed at Pittsburgh, Penna. this 4th day of August 1913.

JOSEPH C. GEHRING, Jr.
RICHARD D. CONRAD.

Witnesses:
JNO. L. O'CONNOR,
J. E. ROUTLEY.